US012211338B2

(12) United States Patent
Sidoti et al.

(10) Patent No.: US 12,211,338 B2
(45) Date of Patent: Jan. 28, 2025

(54) ELECTRONIC GAMING DEVICE WITH ICON SELECTION REMOVAL FEATURE UTILIZING A SPECIAL EFFECTS ANIMATION

(71) Applicant: Aristocrat Technologies Australia Pty Limited, North Ryde (AU)

(72) Inventors: Alessandro Sidoti, St Ives (AU); Dinh Tran, Wetherill Park (AU); Hanson Santoso, Kellyville (AU); Upinder Dhaliwal, Schofields (AU); Saurabh Kalra, Greater Noida (IN); Gaurav Goel, Uttar Pradesh (IN); Sunil Singh, Uttar Pradesh (IN); Romit Aggarwal, Kellyville (AU); Nicholas O'Sullivan, Beacon Hill (AU); Emily Chew, Sydney (AU)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 305 days.

(21) Appl. No.: 17/957,979

(22) Filed: Sep. 30, 2022

(65) Prior Publication Data

US 2023/0419767 A1 Dec. 28, 2023

(30) Foreign Application Priority Data

Jun. 22, 2022 (AU) ................................ 2022204372

(51) Int. Cl.
*G07F 17/32* (2006.01)
*G07F 17/34* (2006.01)

(52) U.S. Cl.
CPC .......... *G07F 17/3211* (2013.01); *G07F 17/34* (2013.01)

(58) Field of Classification Search
CPC ............. G07F 17/3211; G07F 17/3213; G07F 17/326; G07F 17/3262; G07F 17/3267; G07F 17/3295; G07F 17/34
See application file for complete search history.

(56) References Cited

U.S. PATENT DOCUMENTS 9,230,397 B2 * 1/2016 Watkins .................. G07F 17/34
11,657,671 B2 * 5/2023 Wydra ................ G07F 17/3244 463/25
2003/0040355 A1 * 2/2003 Baerlocher ............. G07F 17/32 463/20

(Continued)

*Primary Examiner* — Milap Shah
(74) *Attorney, Agent, or Firm* — McAndrews, Held & Malloy, Ltd.

(57) ABSTRACT

An electronic gaming device comprising a display device, at least one input mechanism, a processor, and a memory storing a plurality of reel strips, and instructions which cause the processor to: select symbols from the reel strips for display at a plurality of symbol positions; display the symbols selected at the symbol positions; in response to a trigger condition being met, initiate an icon selection instance from which one prize of a set of prizes may be awarded, wherein each prize has an associated prize symbol; determine whether to remove one or more prizes from the set of prizes; display a plurality of selectable icons, each of the icons representing a prize; visually remove the one or more prizes; receive selections of the icons until an end condition of a plurality of end conditions is met; and provide an award.

20 Claims, 20 Drawing Sheets

(56) References Cited

U.S. PATENT DOCUMENTS

| | | | | |
|---|---|---|---|---|
| 2004/0102237 | A1* | 5/2004 | Baerlocher | G07F 17/3244 463/16 |
| 2005/0020345 | A1* | 1/2005 | Mead | G07F 17/3244 463/16 |
| 2005/0255902 | A1* | 11/2005 | Lind | G07F 17/3223 463/16 |
| 2015/0221164 | A1* | 8/2015 | Watkins | G07F 17/3258 463/20 |
| 2023/0368616 | A1* | 11/2023 | Tsombanidis | G07F 17/3213 |

* cited by examiner

300

| | 341 | 342 | 343 | 344 | 345 |
|---|---|---|---|---|---|
| | Reel Strip 1 | Reel Strip 2 | Reel Strip 3 | Reel Strip 4 | Reel Strip 5 |
| 301 | A | 10 | Q | 10 | PIC1 |
| 302 | PIC3 | J | K | PIC2 | DYNSCAT |
| 303 | PIC3 | Q | 9 | PIC3 | PIC3 |
| 304 | PIC2 | Q | PIC2 | 9 | Q |
| 305 | K | A | PIC1 | Q | A |
| 306 | DYNSCAT | DYNSCAT | 10 | A | Q |
| 307 | PIC3 | PIC1 | K | A | Q |
| 308 | A | J | WILD | 10 | WILD |
| 309 | J | Q | J | PIC2 | K |
| 310 | 10 | K | PIC3 | K | 9 |
| 311 | A | 9 | Q | PIC1 | DYNSCAT |
| 312 | PIC3 | K | PIC3 | DYNSCAT | 10 |
| 313 | 10 | 10 | DYNSCAT | A | 10 |
| 314 | DYNSCAT | DYNSCAT | Q | J | Q |
| 315 | K | WILD | Q | 10 | A |
| 316 | PIC1 | J | 10 | A | 10 |
| 317 | J | J | A | DYNSCAT | K |
| 318 | Q | A | DYNSCAT | 9 | A |
| 319 | K | PIC2 | PIC2 | 9 | J |
| 320 | A | PIC3 | Q | PIC2 | PIC3 |
| 321 | PIC1 | 9 | A | PIC1 | DYNSCAT |
| 321 | A | PIC3 | J | WILD | 10 |
| 323 | J | DYNSCAT | J | PIC3 | J |
| 324 | Q | Q | DYNSCAT | Q | Q |
| 325 | PIC2 | Q | 9 | A | PIC3 |
| 330 | ... | ... | ... | ... | ... |

*FIG. 3*

FIG. 7
GRAND
$10,000.00
MAJOR
$880.00
MINOR
$100
MAXI
$50
MINI
$30
8
MEGA FREE GAMES WON!
PRESS START FEATURE
CREDIT 9912
WIN 176
2¢

FIG. 8
GRAND
$10,000.00
MAJOR
$880.00
MINOR
$100
MAXI
$50
MINI
$30
CREDIT 9912
WIN 176

ELECTRONIC GAMING DEVICE WITH ICON SELECTION REMOVAL FEATURE UTILIZING A SPECIAL EFFECTS ANIMATION

RELATED APPLICATION

The present application claims priority to Australia Patent Application No. AU 2022204372, filed Jun. 22, 2022, and entitled "Gaming Device with Icon Selection Feature" which is hereby incorporated by reference in its entirety.

FIELD

The present application relates to a gaming device, a method of operating a gaming device and a system where during an icon selection feature game, a prize may be removed from a prize set to form a reduced set of winnable prizes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Gaming systems or devices may allow players to win awards. The awards may be determined based on predefined volatility criteria or RTP. Yet technical problems exist involving how a gaming device may satisfy a designated game RTP that either complies with applicable regulations for certain game features or is set to achieve a certain game volatility, where the gaming device involves a single window game instance converted to multiple window game instances based on random outcomes, with persistent game symbols and increasing the numbers of ways to win based on bet sizes. To meet or satisfy a target volatility criterion or designated RTP, the random nature of a game determination may, in a such a game conversion configuration with increasing the number of game instances in display windows, in turn and for example, drive a game device to over process and generate numerous game outcomes in the background for each display window before determining and displaying a game outcome to a player that satisfies the target volatility criterion or designated RTP for the designated jurisdiction.

Repeated determination of whether each of the numerous game outcomes yields the designated volatility each time the game is played may be an inefficient, and time and resource consuming process. Additionally, the confined screen size of many gaming devices creates challenges as to how game changes and related information are effectively communicated to the viewer.

SUMMARY

There is disclosed a gaming device, a method of operating a gaming device and a system where during an icon selection feature game, a prize may be removed from a prize set to form a reduced set of winnable prizes and a display is modified to visually indicate removal of the prize. In an advantageous example, a lowest winnable prize is removed.

An example embodiment describes an electronic gaming device comprising: a display device; at least one input mechanism; a processor; and a memory storing (i) reel data defining a plurality of reel strips, and (ii) instructions which, when executed by the processor, cause the processor to: select, based on one or numbers dynamically generated by a random number generator, symbols from the reel strips for display at a plurality of symbol positions in response to receipt of a wager via the at least one input mechanism; control the display device to display the symbols selected at the symbol positions; evaluate the symbols selected for one or more winning outcomes; in response to a trigger condition being met, initiate an icon selection instance from which one prize of a set of prizes may be awarded, wherein each prize has an associated prize symbol; determine, based on the one or more other numbers dynamically generated using the random number generator, whether to remove one or more prizes from the set of prizes such that the one prize may be awarded from a reduced set of prizes in the icon selection instance; control the display device to display a special effects animation that includes a plurality of selectable icons, each of the selectable icons representing a prize from the set of prizes; upon determining to remove the one or more prizes, control the display device to modify the special effects animation to visually remove the one or more prizes; receive selections of the selectable icons via the at least one input mechanisms until an end condition of a plurality of end conditions is met; and upon a defined number of prize symbols being revealed responsive to the selections of the selectable icons until the end condition is met, provide an award from the set of prizes or the reduced set of prizes based on the revealed prize symbols.

Another example embodiment describes a non-transitory computer readable medium storing a plurality of instructions and reel data defining a plurality of reel strips for use with a gaming device comprising a display device, at least one input mechanism, a processor, and the instructions, when executed, cause the processor to perform the steps of: using a weighted table and based on at least one or more numbers dynamically generated by the random number generator and based on a target return to player (RTP), mapping symbols from the reel strips for display at a plurality of symbol positions in response to receipt of a wager via the at least one input mechanism; controlling the display device to display a special effects animation including the symbols mapped at the symbol positions; evaluating the symbols mapped for one or more winning outcomes; in response to a trigger condition being met, initiating an icon selection instance from which one prize of a set of prizes is awardable, wherein each prize has an associated prize symbol; determining, using the at least one or more numbers dynamically generated by the random number generator and a second weighted table that complies with the target RTP, whether to remove a prize from the set of prizes such that one prize of a reduced set of prizes may be awarded; controlling the display device to update the special effects animation to include a plurality of selectable icons; upon determining to remove a prize, controlling the animation to visually indicate removal of the prize; adjusting a probability of receiving an award by removing the prize; receiving selections of the selectable icons via the at least one input mechanism until an end condition is met; and upon a defined number of prize symbols being revealed responsive to the selections of the selectable icons until the end condition is met, making the award from the set of prizes or the reduced set of prizes based on the revealed prize symbols.

Another example embodiment describes an electronic gaming system comprising: at least one display device; a random number generator; at least one input mechanism; one or more processors; and memory storing (i) reel data defining a plurality of reel strips, and (ii) instructions which, when executed by the one or more processors, cause the one or more processors to: select, using at least one number dynamically generated by the random number generator and based on a target return to player (RTP), symbols from the reel strips for display at a plurality of symbol positions in response to receipt of a wager via the at least one input mechanism; control the at least one display device to display a special effects animation including the selected symbols at the symbol positions; evaluate the selected symbols for winning outcomes; determine whether an icon selection event is triggered by a trigger condition; in response to the trigger condition being met, executing the icon selection event; control the at least one display device to modify the special effects animation to display an initial icon selection display comprising a predefined number of icons, each of the icons representing at least one prize, wherein each prize has an associated prize symbol; determine whether to remove at least one prize from a set of prizes based on a second trigger condition; upon determining to remove the at least one prize, control the display device to modify the special effects animation to visually indicate the removal of the least one prize, such that a reduced set of prizes is displayed; remove the at least one prize by displaying an unselectable version of the icon representing the at least one prize; receive selections of the icons in the reduced set of prizes via the at least one input mechanism until an end condition of a plurality of end conditions is met; upon a defined number of prize symbols being revealed responsive to the selections of the icons until the end condition is met, make an award from the set of prizes or the reduced set of prizes based on the revealed prize symbols; and modify the special effects animation to indicate the award.

BRIEF DESCRIPTION OF THE DRAWINGS

FIG. 3 illustrates an example reel strip layout.

DETAILED DESCRIPTION

Figure 1:
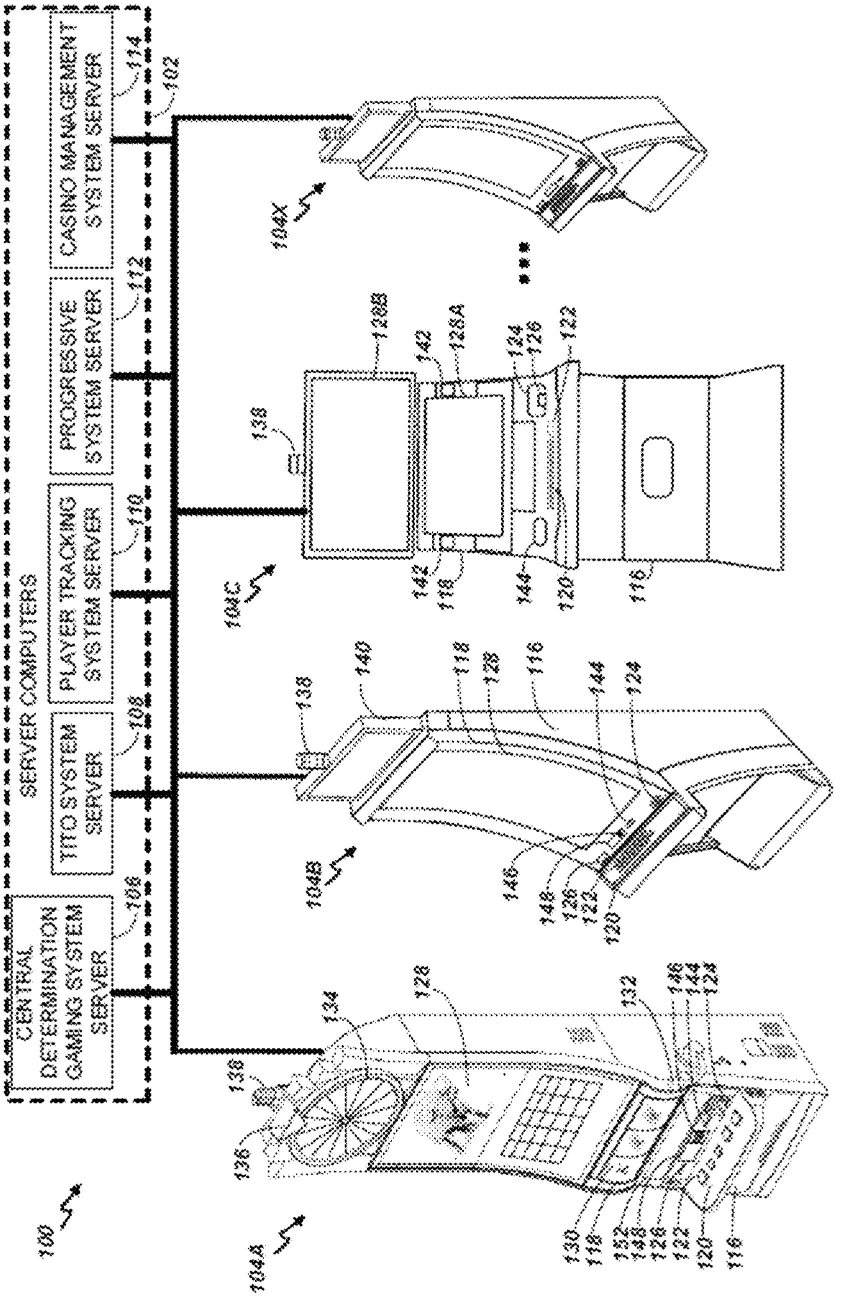
FIG. 1 is an exemplary diagram showing several EGMs networked with various gaming related servers.

Embodiments of the present disclosure represent a technical improvement in the art of electronic gaming machines, devices, systems, and operation of such electronic gaming machines, devices, or systems. Some embodiments of the present disclosure include an improved electronic gaming machine that dynamically configures an icon selection feature game where a prize may be removed from a prize set so that a reduced set of prizes is awardable.

However, game design challenges arise when implementing icon selection feature games. Technical challenges occur, and have to be overcome, when icon selection feature games are implemented, because reducing the number of selectable icons risks potential high payouts that exceed the allowable RTP. These challenges require realization of gaming machine processing configuration to control enhanced play characteristics across games due to changing volatility and to achieve a predetermined RTP for different feature games.

More specifically, by way of example, exemplary embodiments of the present disclosure improve the technical capability of the electronic gaming machines, devices, and systems. An enhanced technical capability may be accomplished by controlling the processor to provide boosts when metamorphic bags are at their highest states, where a processor is driven to perform a sequence of instructions involving multiple individual feature games and different game states stored in a memory based on a defined trigger probability associated with each of the feature games, including a selectable icon feature game, and assigned ranges of values returnable in conjunction with a random number generator to trigger one or more of the feature games, for example. In general, embodiments of the present disclosure dynamically configuring a selectable icon feature game with game characteristics and game states when the feature game is triggered, while still achieving a predetermined volatility or a predetermined RTP to comply with jurisdictional regulations.

Technical challenges exist in adding or removing selectable icons in a selectable icon feature game. In some embodiments of the present disclosure, the points, credits, or states achieved in a game adversely may affect how a feature game is played, and particularly, how the volatility is determined. For example, in some embodiments, the improvement in gaming machine capability occurs through operational advantages in, among other things, configuring a triggered feature game by processing dynamically to allow the coins accumulated, counted or monitored to trigger or activate a feature game, to determine a number of reel spins to collect the coins required to activate the feature game, to change weight tables and/or reels for determining wins and/or awards, and to determine additional payout or award dynamically when the feature game is reached.

Challenges also occur in steady state feature game progressions. Improvements in game machine capability occur with embodiment of the present invention through recognition of the advantage of employing game processing to control the speeds or metamorphic progression at which feature games are transitioning or progressing from a current state to a higher state or a highest state, while achieving the RTP and game volatility. As such, in some embodiments, the metamorphic progression or speed may be controlled, for example, such that higher paying variations will access higher states quicker. In other embodiments, the metamorphic progression or speed may be controlled by having more states such that the transition from a lower state to the highest state may take longer. In yet other embodiments, the metamorphic progression or speed may be controlled, for example, such that higher paying variations will access higher states slower.

Additionally, an improvement in the graphical user interface of the game machine is achieved by employing a feature game that may, concurrently or subsequently, function to animate special effects on a display in response to one or more of the feature games being initiated based on a metamorphic progression. Such graphical effects on the display efficiently use the available fixed-size display screen of the gaming machine or device to visually communicate enhanced game play characteristics and outcomes, while still accommodating presentation and appreciation of traditional gaming visual effects, e.g., a base game, and credits, etc. Such a display allows the player to rapidly appreciate and understand visually the graphical effects game progress, award differences and gaming actions to be taken without being overly burdened by complicated visual presentation and mathematical calculations. The enhanced display, in turn, provides improved game interaction and anticipation characteristics for the player and provide more varied game outcomes. Thus, embodiments of the present disclosure are not merely new game rules or simply new display patterns, but provide technologic improvements to computer and gaming capabilities and graphical user interfaces in the technical art of electronic gaming machines.

The above example is not intended to be limiting, but merely exemplary of technologic improvements provided by some embodiments of the present disclosure. Technological improvements of other embodiments are readily apparent to those of ordinary skill in the art in light of the present disclosure.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Reim XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
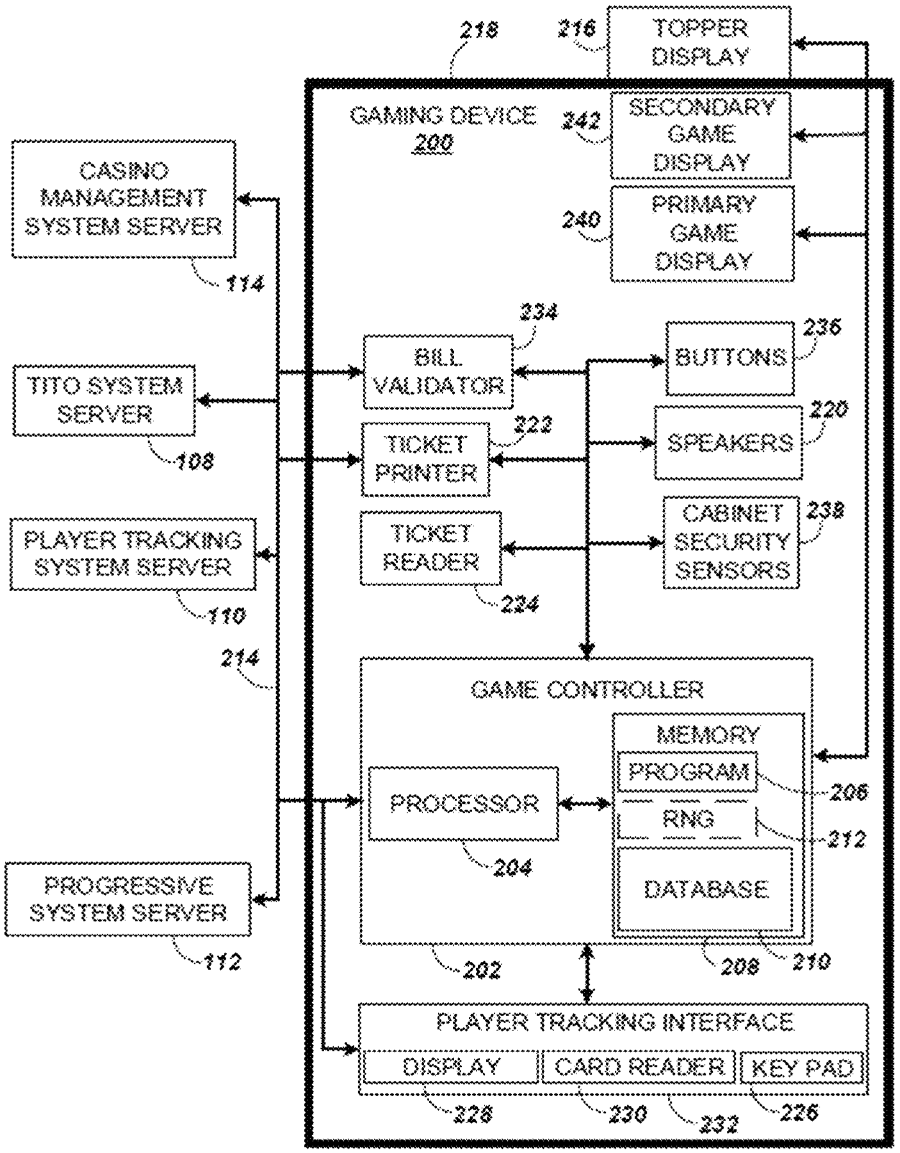
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
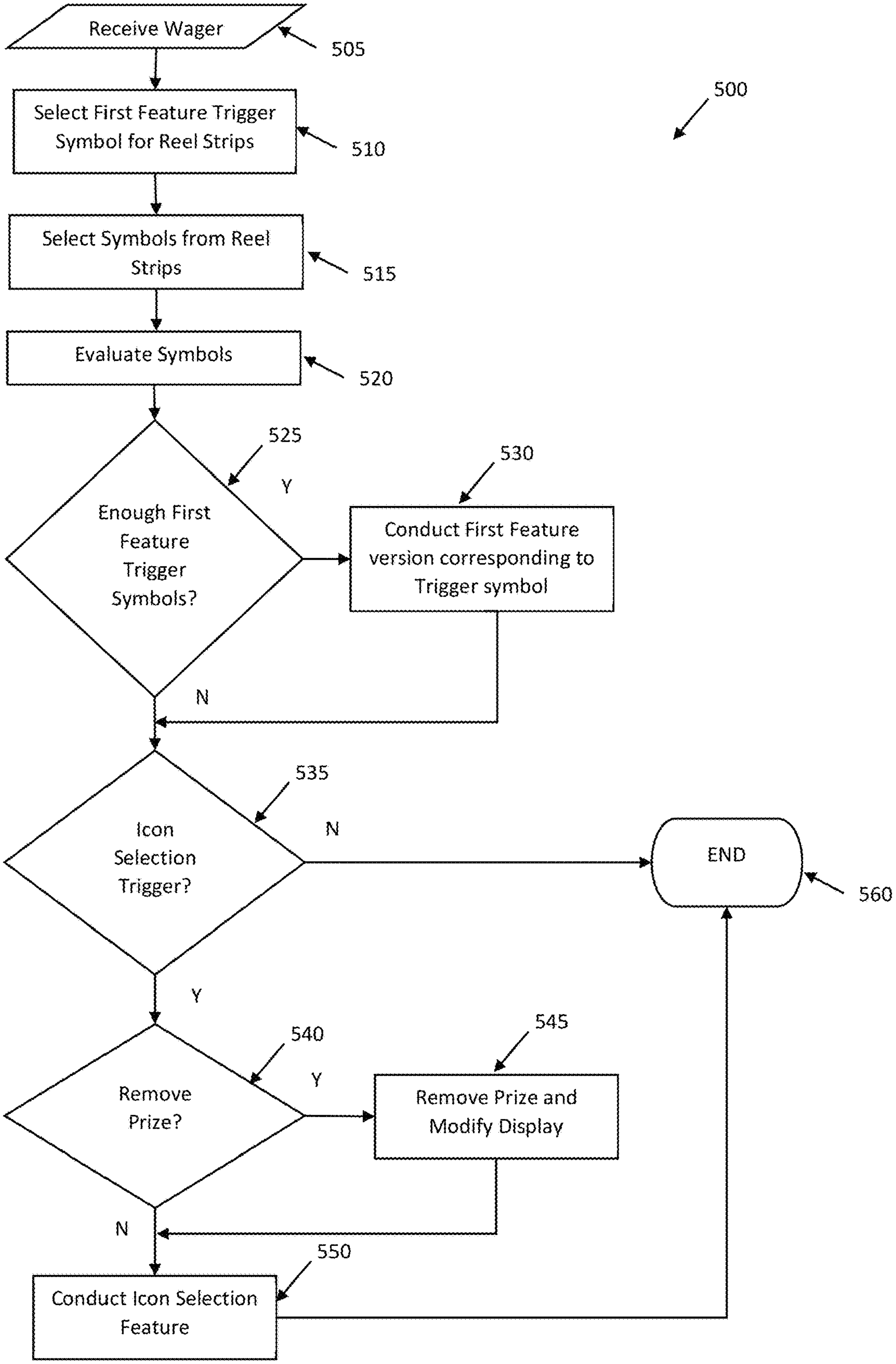
FIG. 5 is a flow chart of a method of operating a gaming device.

FIG. 5 is a flow chart of an example embodiment of a method 500 of operating a gaming device 200. At step 505, the processor 204 receives a wager input by a player using an input mechanism, for example, a virtual button deck—that is a touch screen display that displays virtual buttons that the player can "press" by touching the virtual button deck where one of a plurality of buttons is displayed. In other examples, a physical button deck may be employed or a hybrid button deck having a mixture of virtual and physical buttons. The buttons may include a play button which allows the player to place the same wager again.

At step 510, the processor configures the reel strips for use in the current game instance by selecting a first feature trigger symbol for configurable positions on the reel strips. FIG. 3 illustrates an example of a set 300 of five reel strips 341, 342, 343, 344, 345. In the example, for illustrative purposes, twenty-five reel strip positions 301-325 are shown for each reel strip 341-345. In this example, each reel strip position of each reel has a symbol. In other examples, there may be one or more blank symbol positions. For example, a "Wild" symbol occupies the eight reel strip position 308 of the third reel strip 343. The symbols shown on the reel strips 341-345 are generally indicative of symbols that may be employed in other embodiments, however, other reels strips to those illustrated in FIG. 3 can be used. Symbol position 330 indicates that the reel strips 341-345 will typically have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

As shown in FIG. 3, in this example, each of the reel strips have configurable positions as indicated by the symbol "DYNSCAT" (see, for example, the sixth position 306 of the first and second reel strips 341, 342. DYNSCAT is a contraction of dynamic and scatter that indicates that the symbols can be changed (are dynamic) and will be evaluated as scatter symbols, that is evaluated independently of the position at which they are selected. While this example shows configurable positions on each reel strip other examples may only have configurable positions on some of the reel strips. For example, in a case where the trigger symbols also act as wild symbols, there may be no configurable positions on a first reel strip.

In order to select the trigger symbol that will occupy each of the configurable positions (take the place shown by DYNSCAT), processor 204 uses a weighted table stored in memory 208 that defines the relative probability of the trigger symbols being selected as well as a number returned by random number generator 212. In this example, there are four different trigger symbols as set out in Table 1 and they correspond to four different versions of a first feature game, in this example a free games feature. Again, Table 1 "SCAT" indicates that the trigger symbols will be evaluated as scatter symbols.

TABLE 1

| Trigger Symbol | Feature Version | Characteristic |
|---|---|---|
| SCAT1 | Free Games | 1 Active Window |
| SCAT2 | Super Free Games | 2 Active Windows |
| SCAT3 | Mega Free Games | 4 Active Windows |
| SCAT4 | Ultra Free Games | 8 Active Windows |

In this example, the feature versions differ in respect of a number of active game windows during the feature game. In other examples, there can be different numbers of trigger symbols (e.g. 3 or 5) corresponding to a different number of versions of a feature game. In other examples, other feature games can be employed as the first feature game, for example, a hold and spin feature game.

At step 515, the processor 204 selects symbols for the current game instance from the configured reel strips and controls the display 240 to display the selected symbols.

Figure 4:
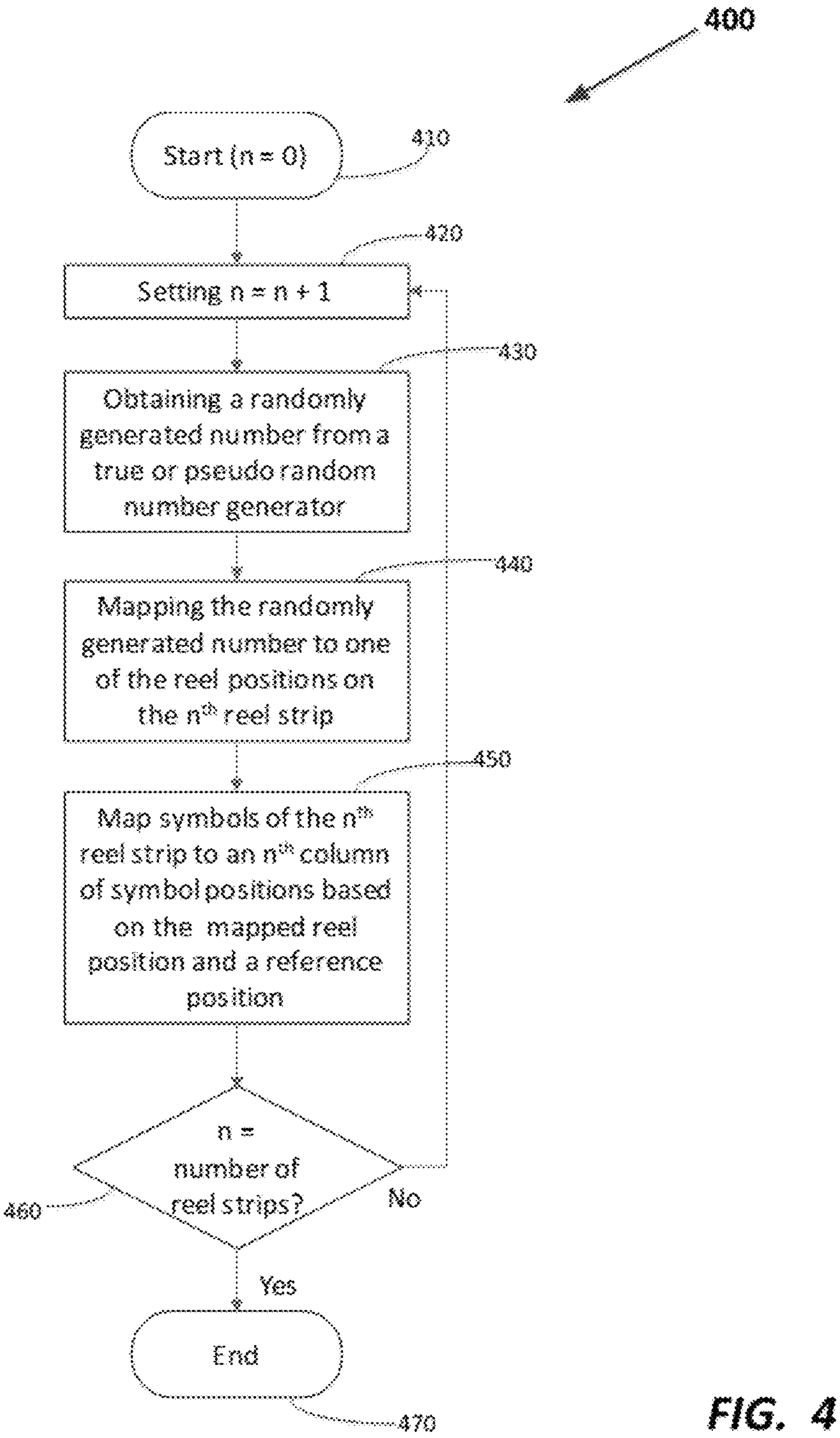
FIG. 4 is a flow chart of a symbol selection method.

FIG. 4 is a flow chart of an example method 400 carried out by the processor 204 to select symbols from reel strips 341-345 at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table in memory 208. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. Referring to the example reel strips of FIG. 3, if the value returned by the RNG 212 is mapped to reel position 313 when four symbols are being selected for the first column of symbol positions, then for the first reel strip 341, "10" is mapped to a bottom symbol position and the three symbols immediately above it (here "PIC3", "A", and 9") are mapped to the symbol positions above the symbol position while preserving the reel strip order of the first reel strip. The number of symbols mapped can be changed in examples where there are different numbers of symbol positions in a column.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. It will be appreciated that in other examples, there may different numbers of symbol positions. Indeed, in some of the examples described below, the number of symbol positions in the columns varies depending on the state of the game.

Figure 6:
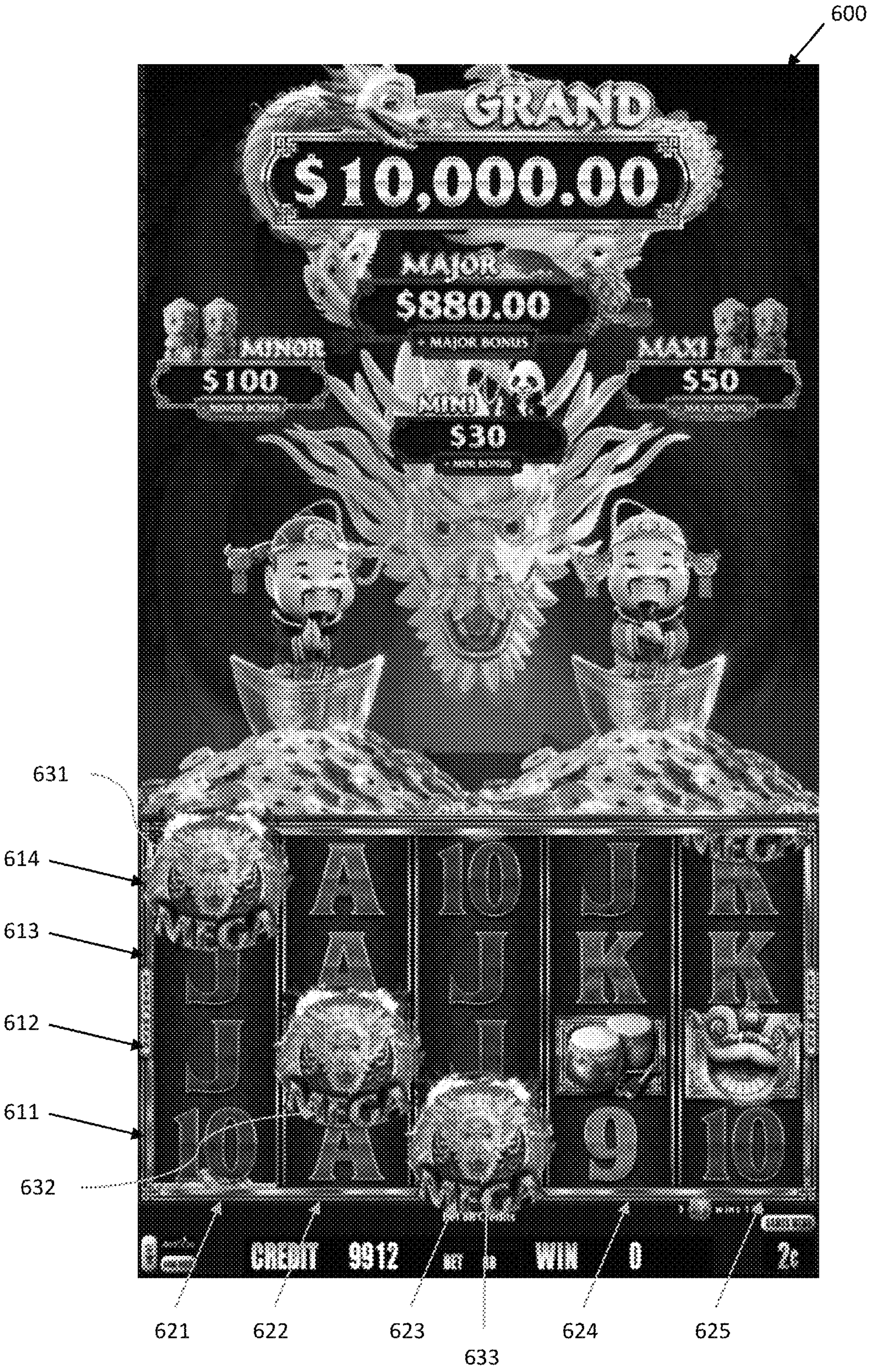
FIGS. 6 to 20 are example screen displays resulting from operating the gaming device.

After the symbols of all reel strips have been mapped to symbol position, the processor 204 controls display 240 to display them at the symbol positions. For example, as shown in the example screen display 600 of FIG. 6, symbols of the five reel strips are mapped to five columns 621-625 of four symbol positions such that there are also four rows 611-614 of symbol positions. In this respect, FIG. 6 is an example where the configurable positions of the reel strips have been configured with the "Mega" trigger symbol (SCAT 3 above) and the selected symbols include three Mega trigger symbols 631-633.

At step 520, the processor 204 evaluates the selected symbols, in this example, based on a pay table stored in memory 208. In this example, there are up to $4^5$=1024 ways to win depending on the wager made using the input mechanism.

Figure 7:

At step 525, the processor determines whether the selected symbols include enough first feature trigger symbols for the version of the first feature to be triggered. In this example, the threshold number of trigger symbols for triggering the first feature is three trigger symbols. Accordingly, Mega trigger symbols 631-633 will cause the processor 204 to make a positive determination at step 525 after which the processor 208 controls the display 240 to display an award message 710 "8 MEGA FREE GAMES WON! PRESS START FEATURE" as shown in example screen display 700 of FIG. 7 before proceeding to step 530 and conducting the version of the first feature corresponding to the trigger symbol, in this example, the mega free games feature.

Figure 8:

FIG. 8 is an example screen display 800 from the Mega free games feature which shows an example of the characteristic of the "Mega" version of the free games feature that distinguishes it from the other versions is that four game windows 841-844 are used during the feature game with processor 204 independently conducting 8 free games in each game window 841-844 and making awards to the player for any winning combinations. In his example, the Mega feature can be retriggered from any one of the windows 841-844 if sufficient Mega trigger symbols are selected.

As set out in Table 1 above, the distinguishing characteristics of the other versions of the Free Games Feature are that the normal/standard version of the free games feature has one active window, the "Super" version has two active window and the "Ultra" version has eight active windows. In other examples, the version can have different numbers of active windows, e.g. one, two, three or four active windows or have different characteristics, e.g. different numbers of free games.

Figure 9:
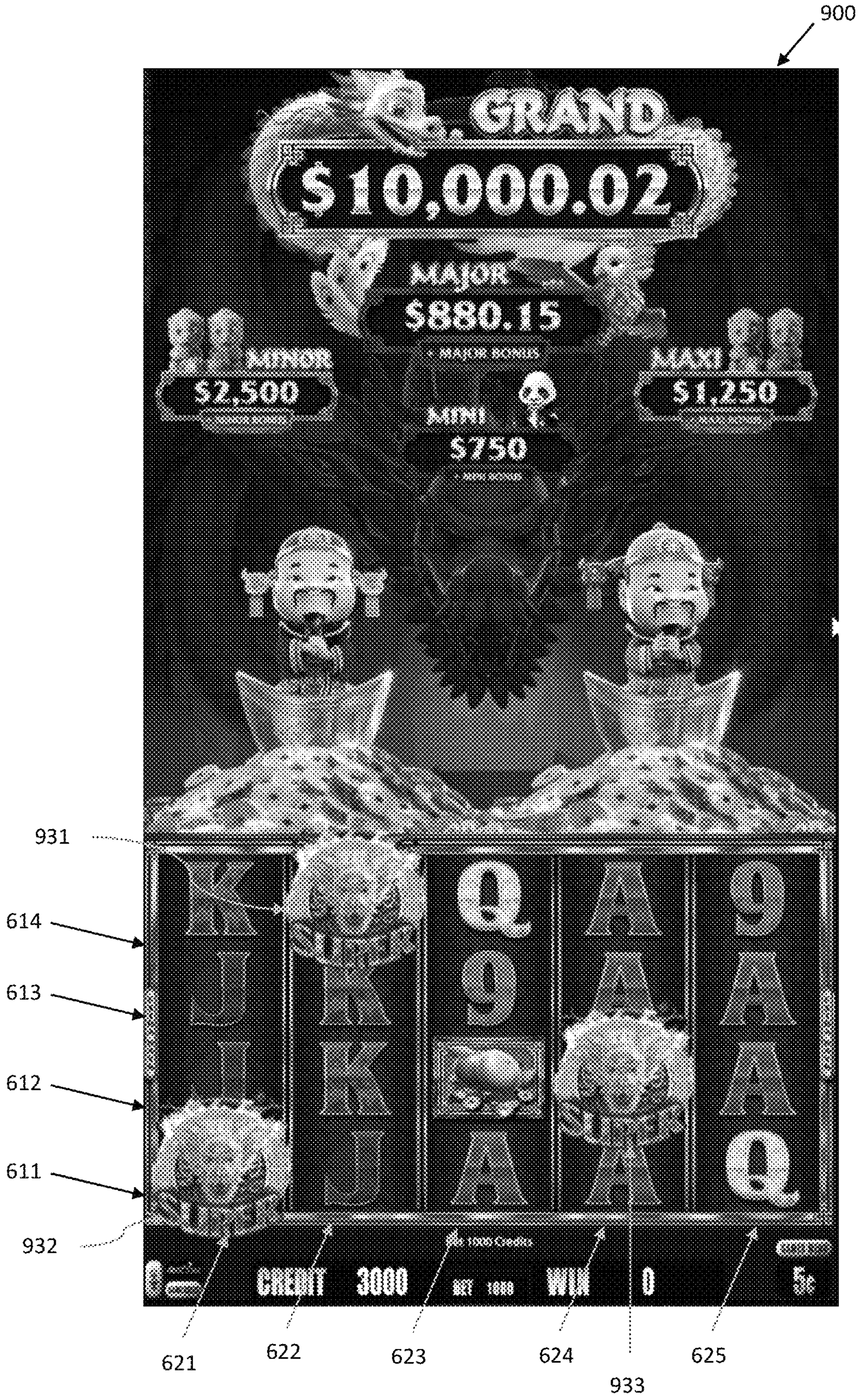

As will be apparent from the FIG. 6, the Mega trigger symbols 631-633 visually indicate which of the feature games will be triggered. The trigger symbols corresponding to each of the feature game versions are also visually distinguished from one another, for example, in the case of the Super, Mega and Ultra trigger symbols by including text with the name of the respective associated feature version. In this respect, FIG. 9 is an example screen display 900 where three "Super" trigger symbols 931-933 (Scat 2) have been selected.

Referring again to FIG. 5, in addition to the first feature game, an icon selection feature can be triggered. The icon selection feature involves the player making selections of icons displayed on display 240. The icon selection feature may also be described as a jackpot feature because a possible outcome of the icon selection feature is award of a jackpot prize.

Figure 10:
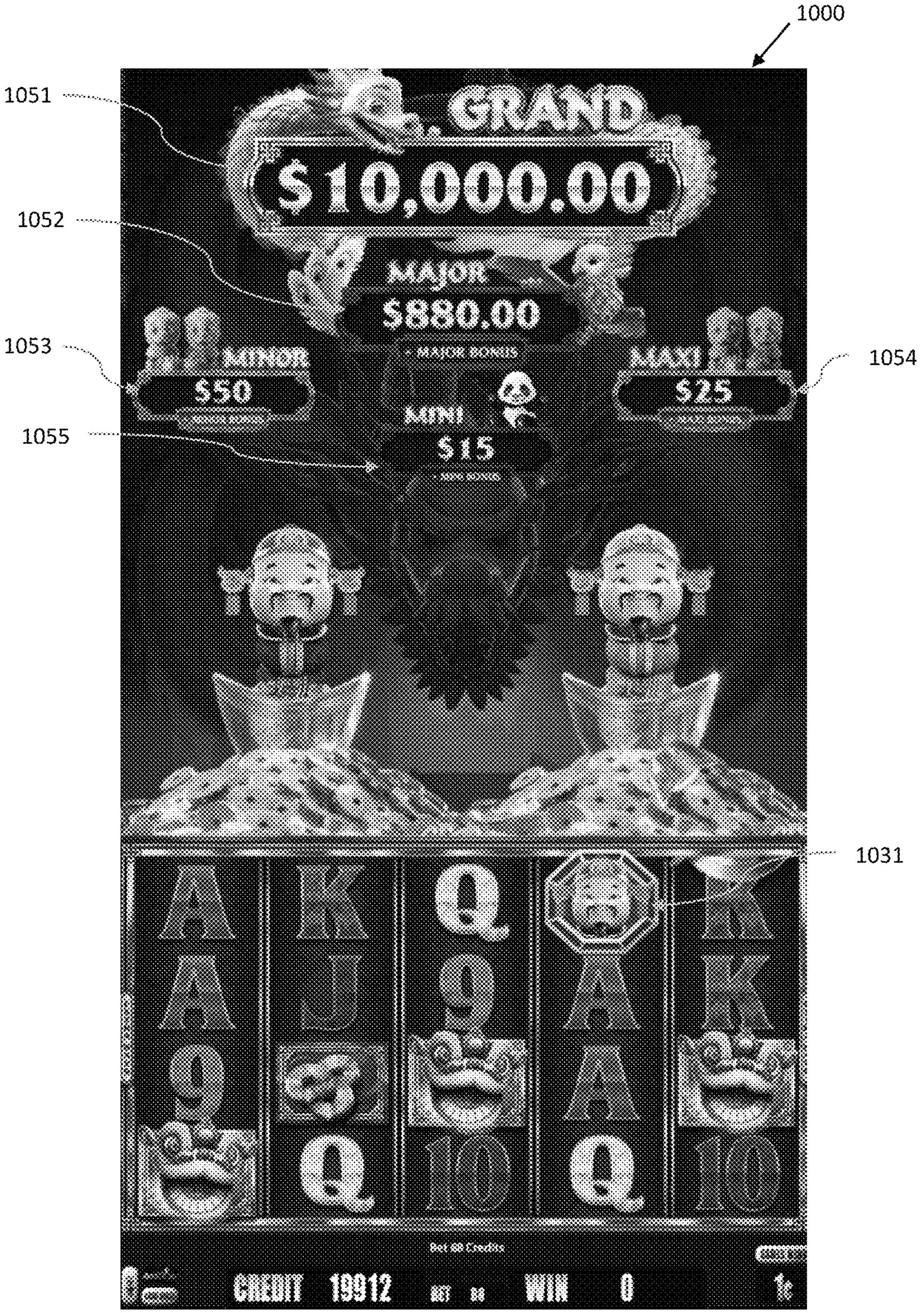

FIG. 10 is an example screen display 1000 prior to triggering of the icon selection feature from which it will be observed that the screen display 1000 has five prize meter graphics 1051-1055 each showing the current value of the respective prize. In this respect, Grand Jackpot prize meter graphic 1051 corresponds to a Grand Jackpot prize which is a progressive prize, Major prize meter graphic 1052 corresponds to a Major prize which is also a progressive prize, Minor prize meter graphic 1053 corresponds to a Minor prize which is a fixed prize, Maxi prize meter graphic 1054 corresponds to a Maxi prize which is also a fixed prize, and Mini prize meter graphic 1055 corresponds to a Mini prize which is also a fixed prize.

At step 535, processor 204 determines whether an icon selection feature trigger condition is met. In this example, the Jackpot Feature may be triggered when one or more WILD symbols 1031 are selected such as shown in FIG. 10. In this example, if one or more WILD symbols, the processor 204 conducts a Jackpot Feature trigger determination using RNG 212 and a weighted probability table stored in memory 208. In an example, the table specifies different weightings for different wager selections.

Figure 11:
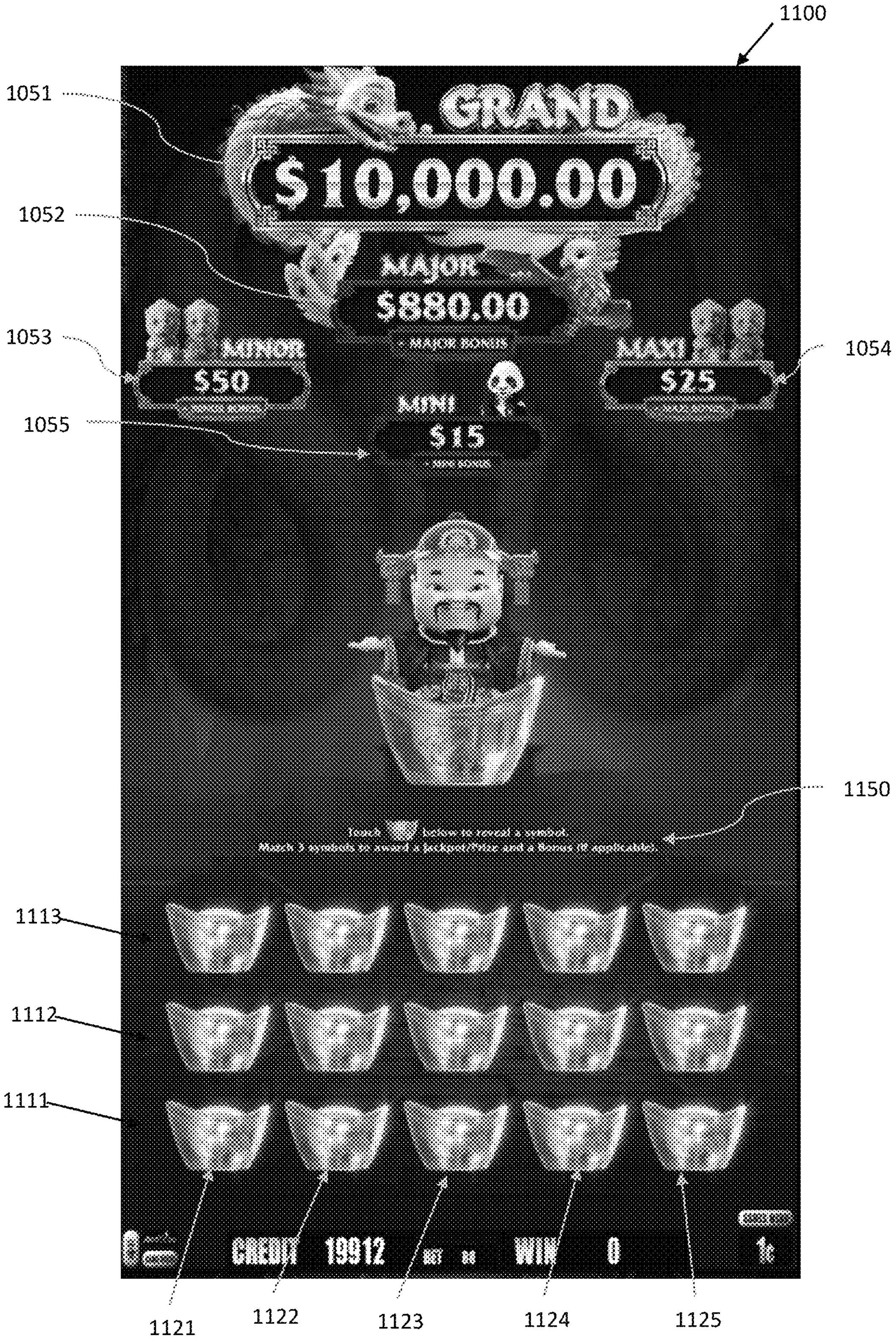

Upon the processor 204 making a positive determination at step 535, processor 204 controls display 240 to display a screen display 1100 of an example icon selection feature as shown in FIG. 11. The screen display 1100 includes fifteen icons arranged in three rows 1111-1113 and five columns 1121-1125, and the game play message 1150: "Touch [ICON] below to reveal a symbol. Match 3 symbols to award a Jackpot/Prize and a Bonus (if applicable)." In this respect, in this example, the fifteen icons correspond to a set of revealable prize symbols stored in memory 208 having three prize symbols for each of the prizes represented by the prize graphics—that is, enough symbols for each prize to meet the "Match 3 symbols" condition. That is, the end condition for the icon selection game is that a defined number (here three) of prize symbols are revealed.

In other examples, there may be more or fewer prizes. Further, in some examples, a set of symbols may include both prize symbols and non-prize symbols such as terminator symbols which cause the icon selection game to be terminated without award of a prize upon a defined number (e.g. 3) of terminator symbols being revealed following selectable icons being selected. In this example, three terminator symbols being revealed is an additional end condition for the icon selection game.

At step 540, processor 204 makes a further random determination using another weighted table stored in memory 208 to determine whether to remove a prize from the set of prizes such that a reduced set of prizes are awardable in the current game instance. In this respect, screen display 1100 shows an example where processor 204 makes a negative determination at step 540 such that all prizes of the original set of prizes are available to win when the processor 204 conducts the icon selection feature game at step 550.

In one example, when conducting the icon selection feature game, the processor 204 responds to touch gestures detected on the display by selecting a prize symbol to be revealed. In an example, the selection conducted by processor 204 is determined by making a random weighted probability selection from the set of fifteen prize symbols without replacement of the prize symbols so that each prize symbol can only be selected once. In this example, the selection process is independent of the actual icon selected. The process continues until the processor 204 determines that three matching symbols have been selected.

In another example, the processor 204 uses the random number generator to select a game outcome of the icon selection feature game, the game outcome defining the end condition (e.g. which prize will be won), a number of selections of icons until the end condition is met, and which symbols will be revealed in response to each of the selections. In an example, the set of outcomes that can be selected are stored in a weighted table in memory 208.

Following conduct of the icon selection feature game, the process ends at step 560 and processor 204 waits for a further wager to be input.

Figure 12:
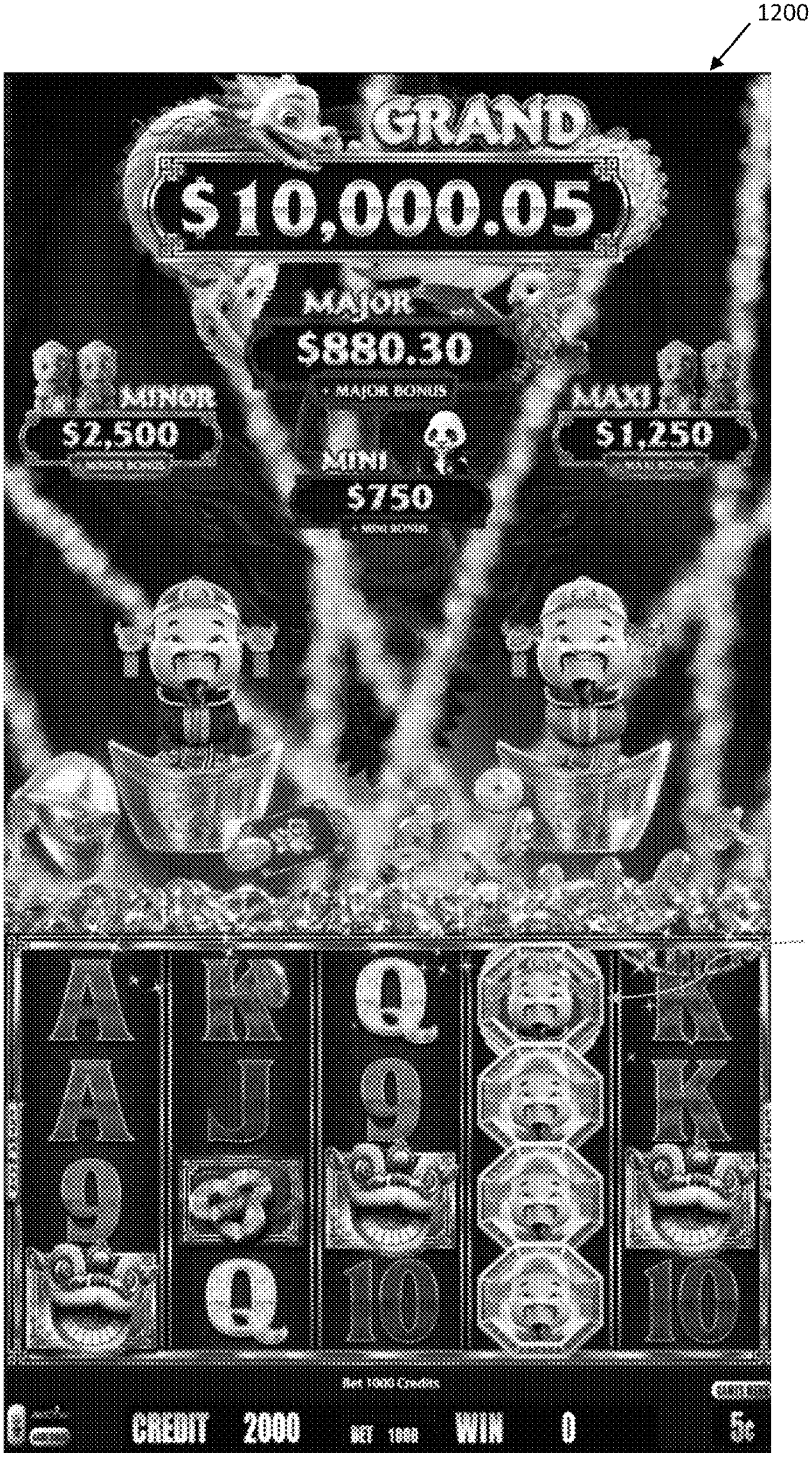
Figure 13:
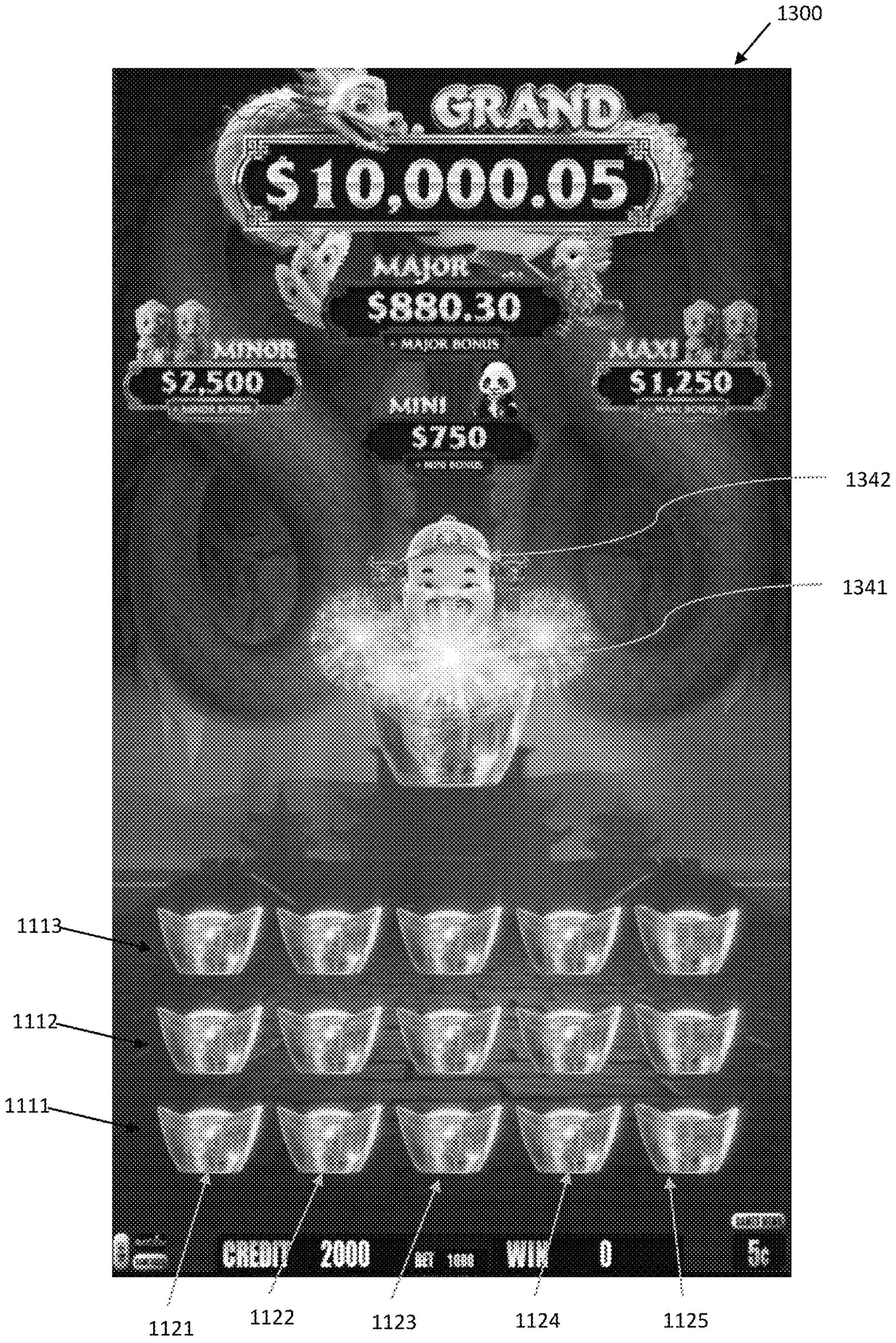

FIG. 12 is a further example screen display 1200 of a wild symbol 1231 being selected causing processor 204 to make a random determination as to whether to trigger the icon selection game as described above. In this example, processor 204 makes a positive determination at step 535 and controls the display 240 to show an initial icon selection screen display 1300 as shown in FIG. 13. In this example, at step 540, processor 204 makes a positive determination to remove a prize from the set of prizes and controls display 240 to display an animation of the prizes being removed 545. FIG. 13 captures the beginning of this animation with balls of light 1341 emerging from animated character 1342 that are the start of the animation.

Figure 14:
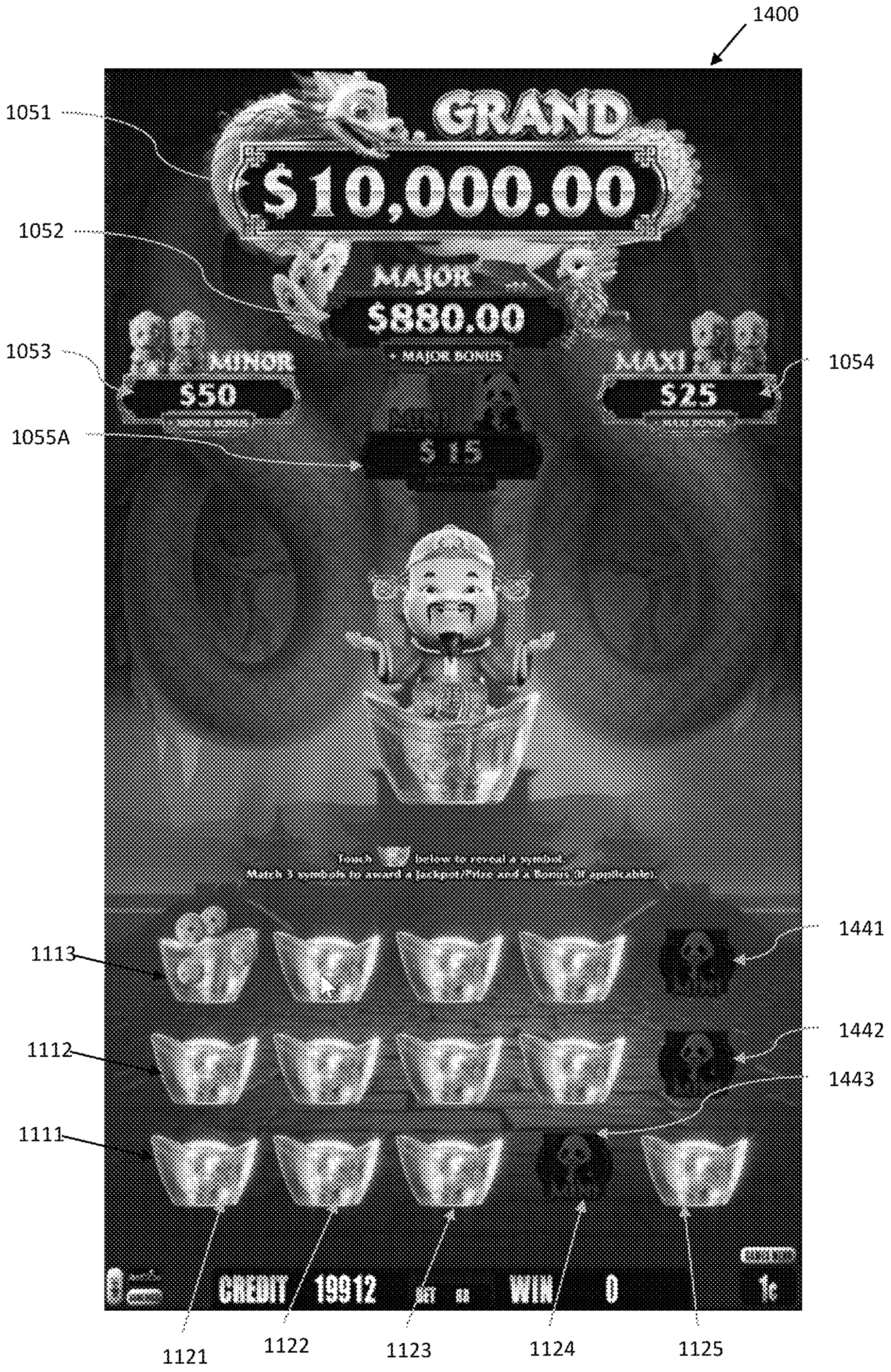

FIG. 14 is an example screen display 1400 a Mini prize has been removed to form a reduced set of prizes. As shown in FIG. 14, processor 204 modifies the display to visually indicate the removal of the prize in two ways. Firstly, by displaying a modified Mini prize indicator 1055A which is greyed out. Secondly, by changing display of three of the icons at random to be greyed-out Mini prize symbols 1441-1443. In this example, the Mini prize is always removed so that the prize removal is an advantageous upgrade of the icon selection feature as the Maxi prize becomes the lowest prize. In another example, there is a chance that the processor 204 removes more than one prize. In another example, one or more prizes to be removed are selected by processor 204 using a weighted table.

Figure 15:
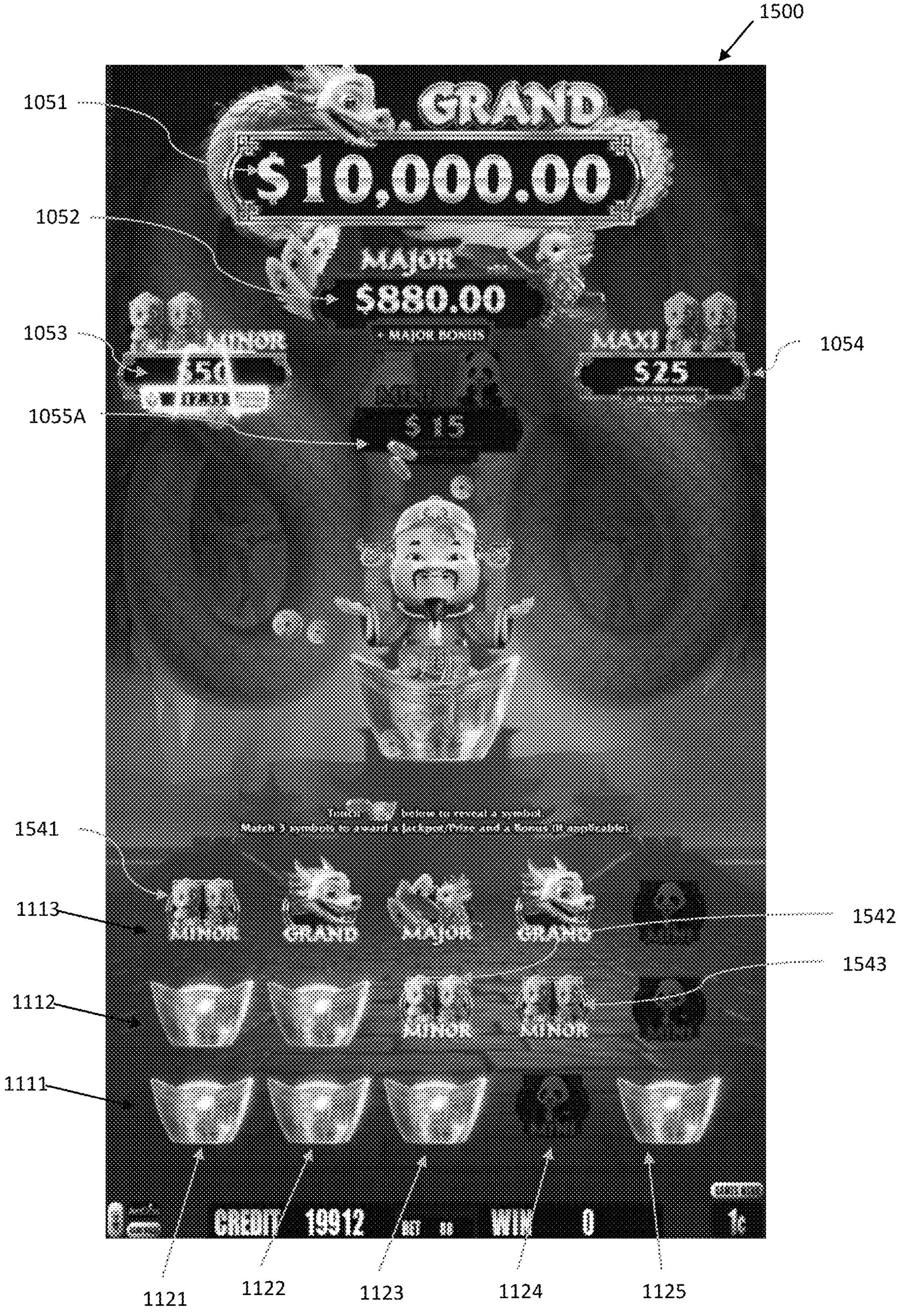

FIG. 15 is an example screen display 1500 when an end condition is met, in this example, where three Minor prize symbols 1541-1543 have been revealed resulting in the award of the Minor prize and a minor bonus.

Figure 16:
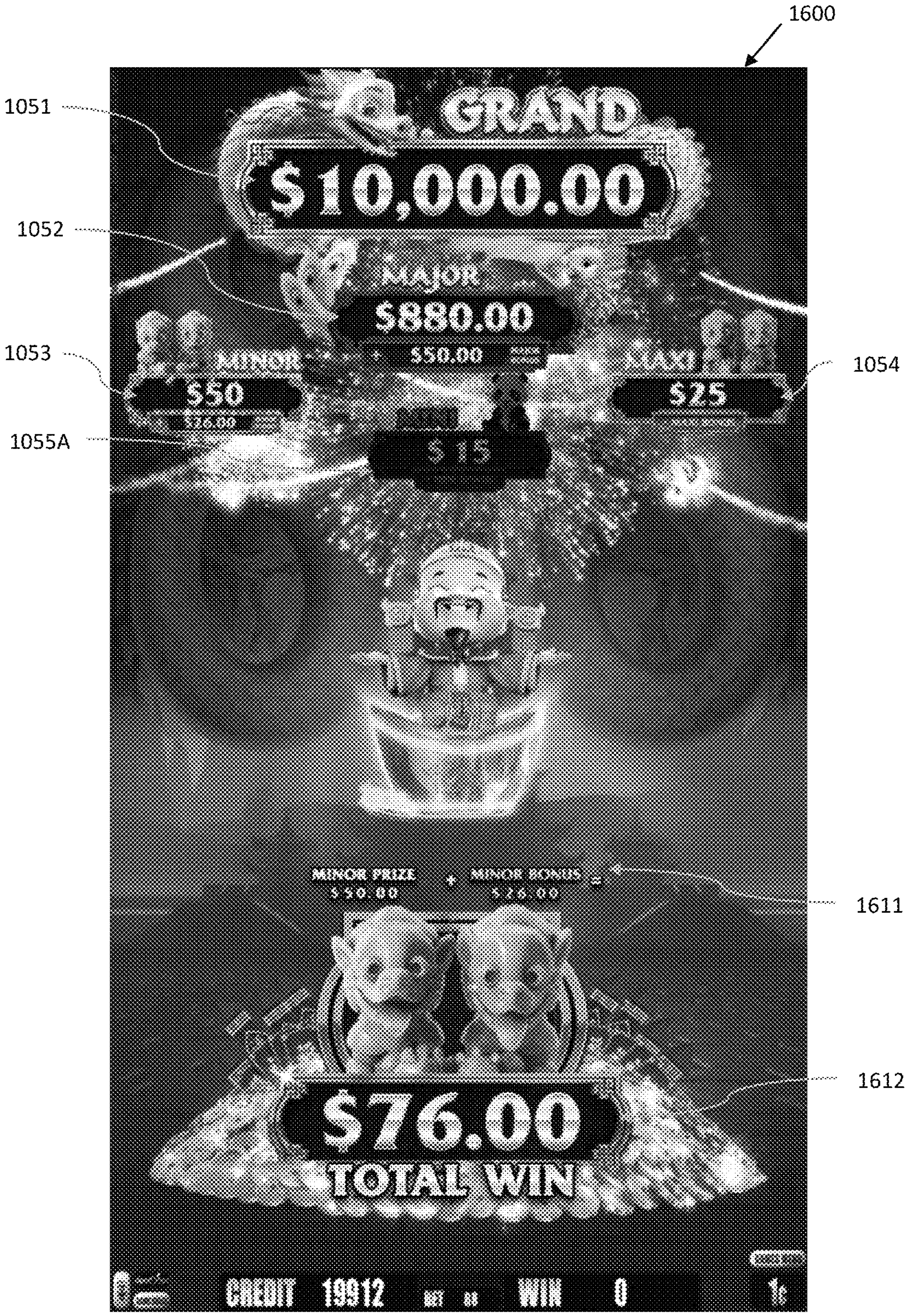

FIG. 16 is an example screen display when processor 204 makes the award. The processor 204 controls the display to display a total award message 1612 of "$76.00 Total Win" and an award composition message 1611 of "Minor Prize $50.00+Minor Bonus $26.00".

Figure 17:
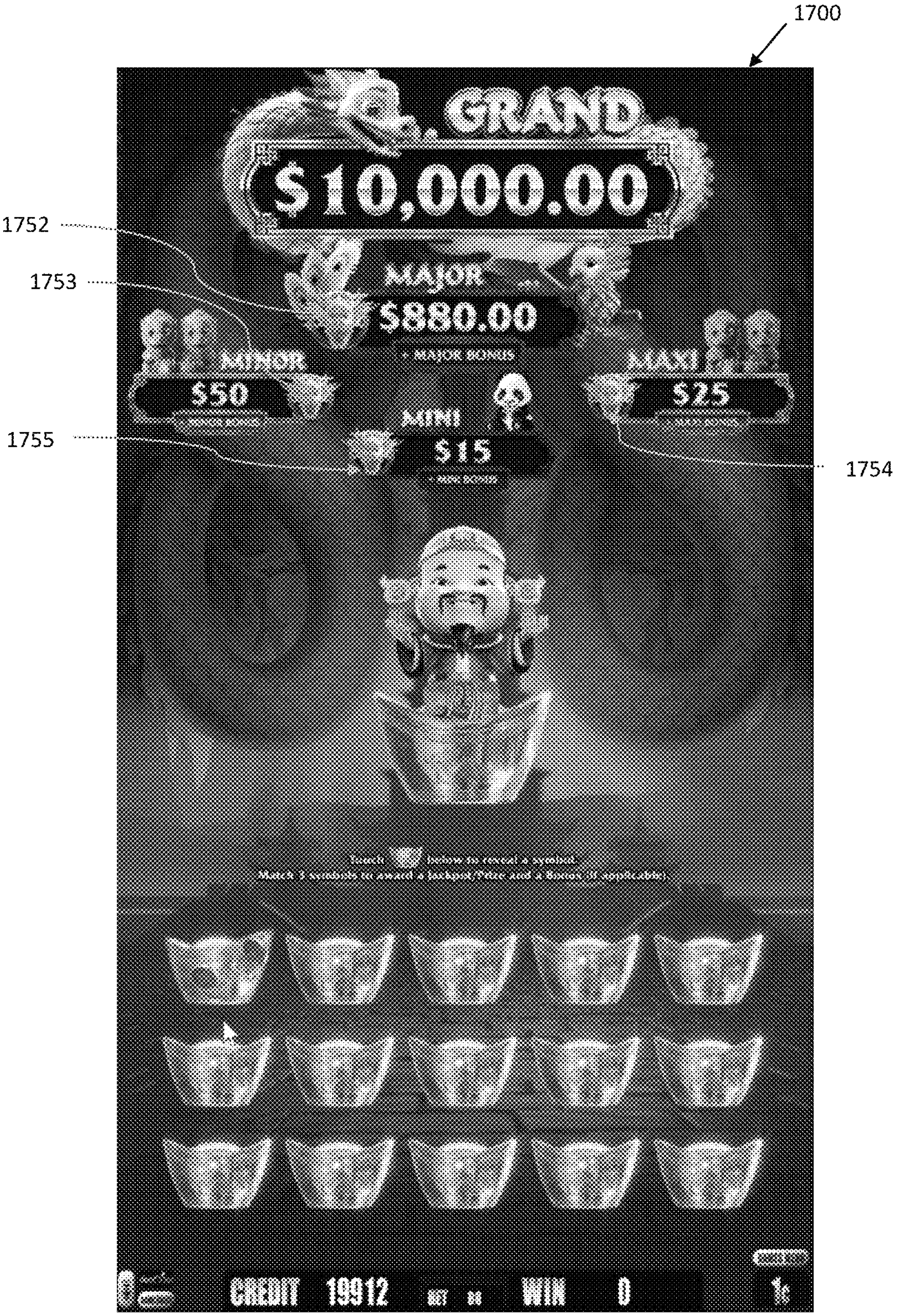

FIG. 17 is an example screen display showing a further potential upgrade of icon selection game. Dragon heads 1752-1755 indicate the possibility of processor 204 awarding multipliers in connection with the Major, Minor, Maxi and Mini prizes. In this respect, in an example, each time an associated prize symbol is revealed, processor 204 conducts a determination as to whether to award a multiplier.

Figure 18:
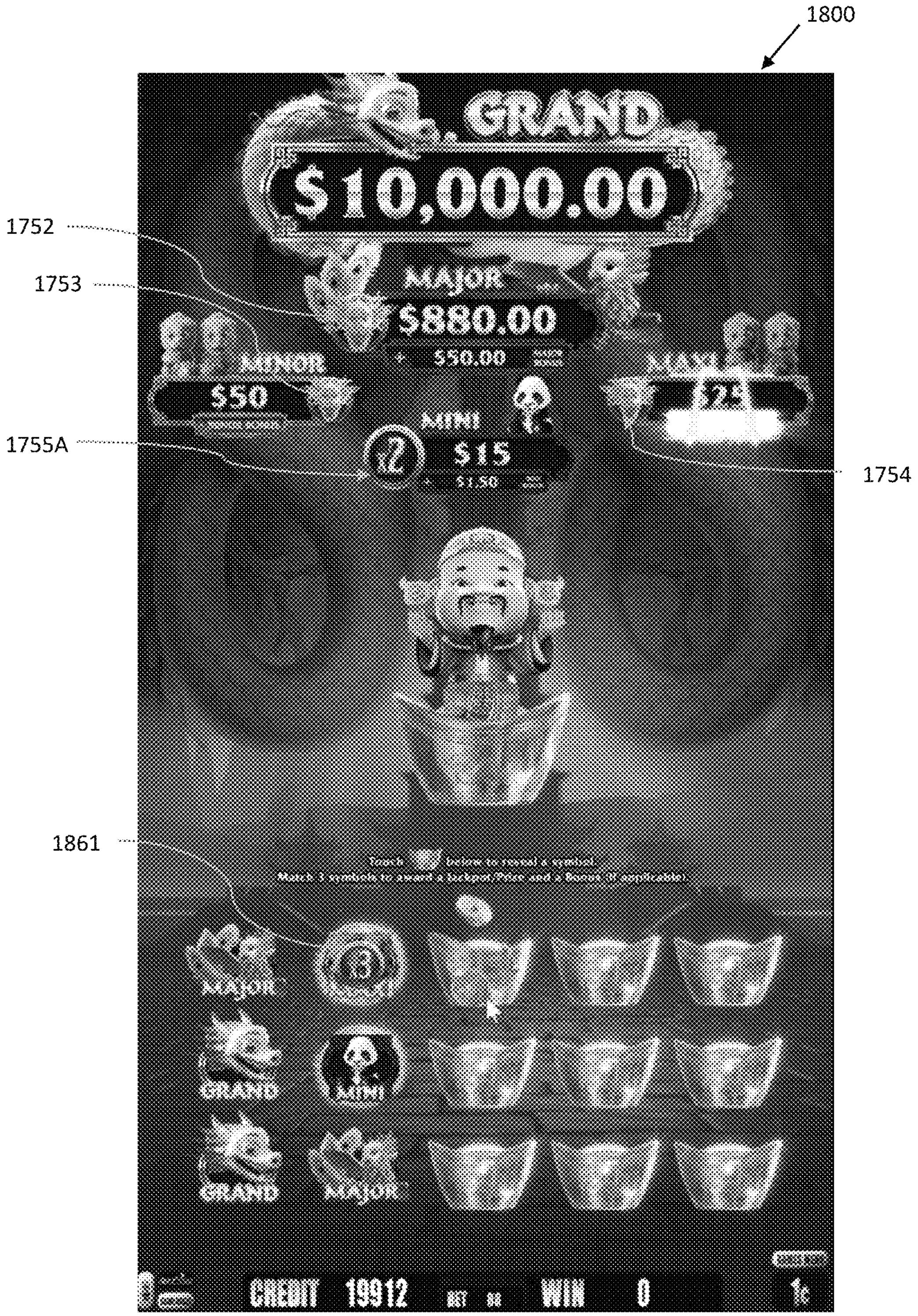

FIG. 18 is an example screen display 1800 showing award of a multiplier. In this respect, dragon head 1755 has been replaced with a multiplier indicator "x2" as part of the Mini prize indicator, to indicate that award of the Mini prize will be multiplied by two. An animation 1761 of a "x3" multiplier over a Maxi prize symbol 186 visually indicating that a x3 multiplier will be added to the Maxi prize indicator 1054 where dragon head 1754 is displayed.

Figure 19:
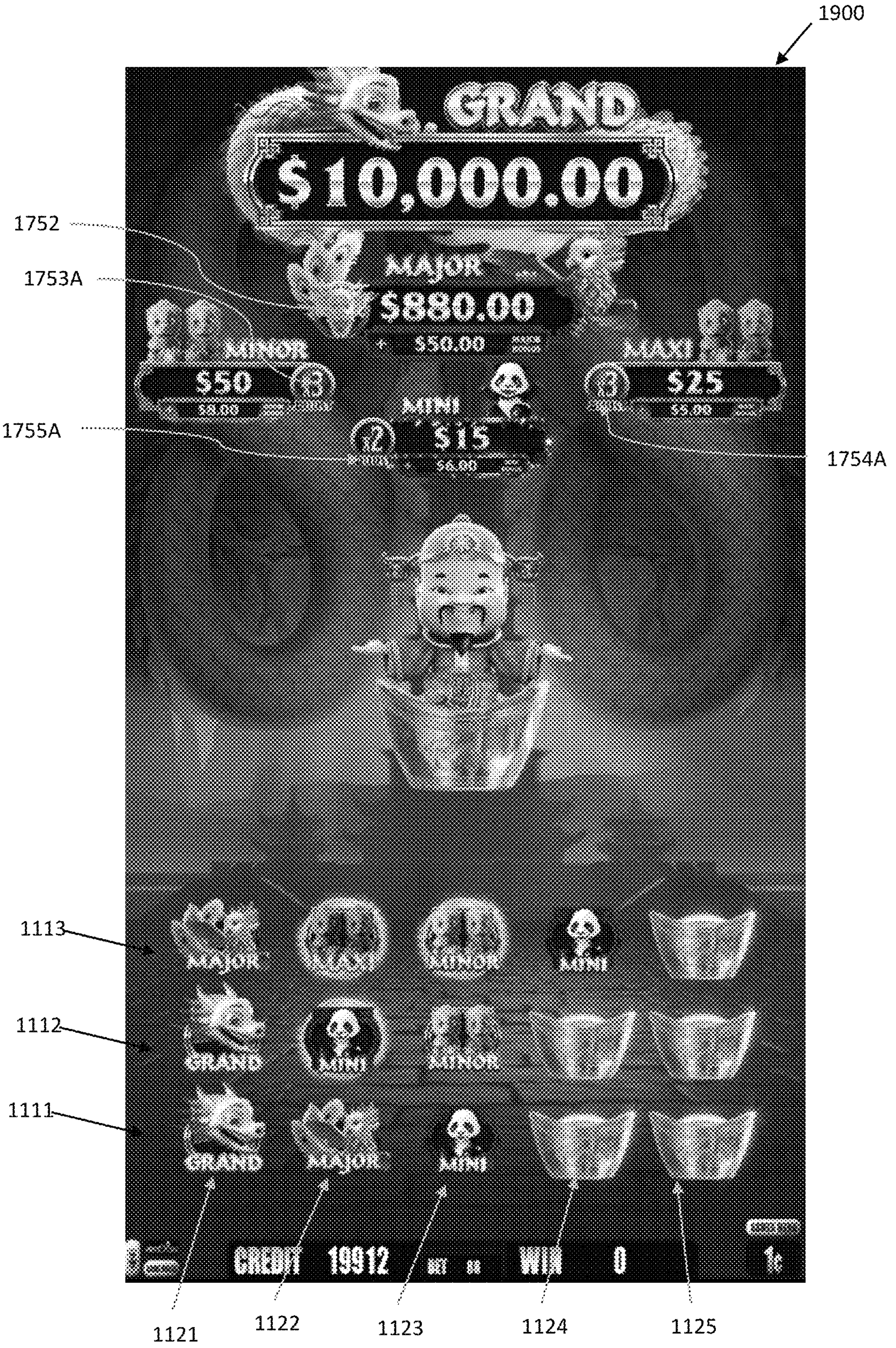

FIG. 19 is an example screen display 1900 showing an end condition of three Mini prize symbols 1941-1943 being revealed in the example of a x2 prize multiplier 1755A having been applied to the Mini prize.

Figure 20:
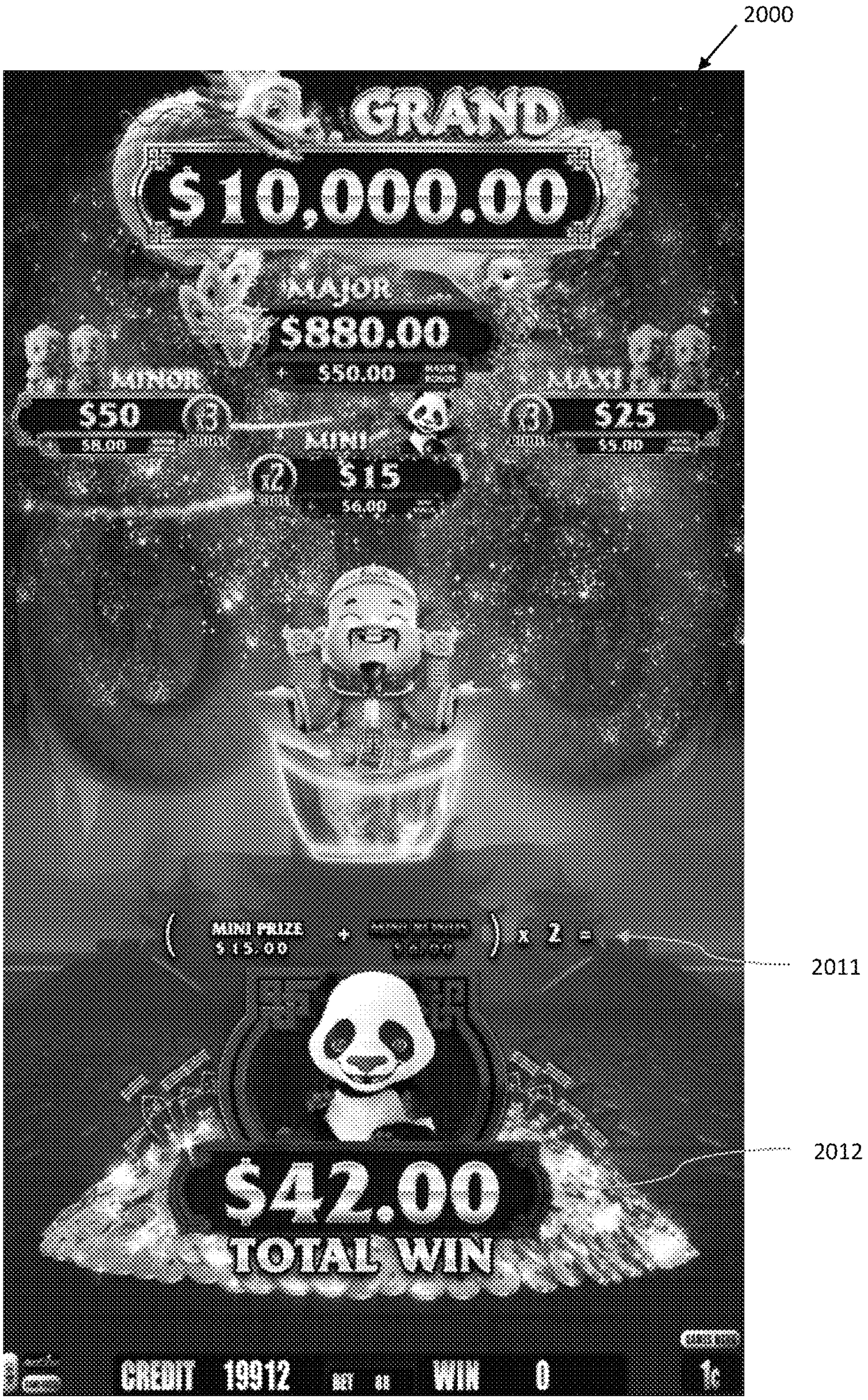

FIG. 20 is a corresponding example screen display when processor 204 makes the award. The processor 204 controls the display to display a total award message 2012 of "$42.00 Total Win" and an award composition message 2011 of "Minor Prize $50.00+Minor Bonus $26.00" that indicates that the x2 multiplier has been applied.

Example Embodiments

In an example embodiment, there is disclosed an electronic gaming device comprising:
- a display device;
- at least one input mechanism;
- a processor; and
- a memory storing (i) reel data defining a plurality of reel strips, and (ii) instructions which, when executed by the processor, cause the processor to:
  - select, based on one or numbers dynamically generated by a random number generator and based on a target return to player (RTP), symbols from the reel strips for display at a plurality of symbol positions in response to receipt of a wager via the at least one input mechanism;
  - control the display device to display the symbols selected at the symbol positions;
  - evaluate the symbols selected for one or more winning outcomes;
  - in response to a trigger condition being met, initiate an icon selection instance from which one prize of a set of prizes may be awarded, wherein each prize has an associated prize symbol;
  - determine, based on the one or more other numbers dynamically generated using the random number generator, whether to remove one or more prizes from the set of prizes such that one prize of a reduced set of prizes may be awarded in the icon selection instance;
  - control the display device to display a special effects animation that includes a plurality of selectable icons, each of the selectable icons representing a prize from the set of prizes;
  - upon determining to remove the one or more prizes, control the display device to modify the special effects animation to visually remove the one or more prizes;
  - receive selections of the selectable icons via the at least one input mechanisms until an end condition of a plurality of end conditions is met; and
  - upon a defined number of prize symbols being revealed responsive to the selections of the selectable icons until the end condition is met, provide an award from the set of prizes or the reduced set of prizes based on the revealed prize symbols.

In another example embodiment, there is disclosed a non-transitory computer readable medium storing a plurality of instructions and reel data defining a plurality of reel strips for use with a gaming device comprising a display device, at least one input mechanism, a processor, and the instructions, when executed, cause the processor to perform the steps of:
- using a weighted table and based on at least one or more numbers dynamically generated by the random number generator and based on a target return to player (RTP), mapping symbols from the reel strips for display at a plurality of symbol positions in response to receipt of a wager via the at least one input mechanism;
- controlling the display device to display a special effects animation including the symbols mapped at the symbol positions;
- evaluating the symbols mapped for one or more winning outcomes;
- in response to a trigger condition being met, initiating an icon selection instance from which one prize of a set of prizes is awardable, wherein each prize has an associated prize symbol;
- determining, using at least a dynamic number generated by the random number generator and a second weighted table that comply with the target RTP, whether to remove a prize from the set of prizes such that one prize of a reduced set of prizes may be awarded;
- controlling the display device to update the special effects animation to include a plurality of selectable icons;
- upon determining to remove a prize, controlling the animation to visually indicate removal of the prize;
- adjusting a probability of receiving an award by removing the prize;
- receiving selections of the selectable icons via the at least one input mechanism until an end condition is met; and
- upon a defined number of prize symbols being revealed responsive to the selections of the selectable icons until the end condition is met, making the award from the set of prizes or the reduced set of prizes based on the revealed prize symbols.

In another example embodiment there is disclosed an electronic gaming system comprising:
- at least one display device;
- a random number generator;

at least one input mechanism;

one or more processors; and memory storing (i) reel data defining a plurality of reel strips, and (ii) instructions which, when executed by the one or more processors, cause the one or more processors to:

select, using at least one number generated by the random number generator and based on a target return to player (RTP), symbols from the reel strips for display at a plurality of symbol positions in response to receipt of a wager via the at least one input mechanism;

control the at least one display device to display a special effects animation including the selected symbols at the symbol positions;

evaluate the selected symbols for winning outcomes;

determine whether an icon selection event is triggered by a trigger condition;

in response to the trigger condition being met, executing the icon selection event;

control the at least one display device to modify the special effects animation to display an initial icon selection display comprising a predefined number of icons, each of the icons representing at least one prize, wherein each prize has an associated prize symbol;

determine whether to remove at least one prize from a set of prizes based on a second trigger condition;

upon determining to remove the at least one prize, control the display device to modify the special effects animation to visually indicate the removal of the least one prize, such that a reduced set of prizes is displayed;

remove the at least one prize by displaying an unselectable version of the icon representing the at least one prize;

receive selections of the icons in the reduced set of prizes via the at least one input mechanism until an end condition of a plurality of end conditions is met;

upon a defined number of prize symbols being revealed responsive to the selections of the icons until the end condition is met, make an award from the set of prizes or the reduced set of prizes based on the revealed prize symbols, wherein the award complies with the target RTP; and modify the special effects animation to indicate the award.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

a display device;

at least one input mechanism;

a processor; and a memory storing (i) reel data defining a plurality of reel strips, and (ii) instructions which, when executed by the processor, cause the processor to:

select, based on one or more numbers dynamically generated by a random number generator and based on a target return to player (RTP), symbols from the reel strips for display at a plurality of symbol positions in response to receipt of a wager via the at least one input mechanism;

control the display device to display the symbols selected at the symbol positions;

evaluate the symbols selected for one or more winning outcomes;

in response to a trigger condition being met, initiate an icon selection instance from which one prize of a set of prizes may be awarded, wherein each prize has an associated prize symbol;

determine, based on the one or more other numbers dynamically generated using the random number generator, whether to remove one or more prizes from the set of prizes such that the one prize may be awarded from a reduced set of prizes in the icon selection instance;

control the display device to display a special effects animation that includes a plurality of selectable icons, each of the selectable icons representing a prize from the set of prizes;

upon determining to remove the one or more prizes, control the display device to modify the special effects animation to visually remove the one or more prizes;

receive selections of the selectable icons via the at least one input mechanism until an end condition of a plurality of end conditions is met; and upon a defined number of prize symbols being revealed responsive to the selections of the selectable icons until the end condition is met, provide an award from the set of prizes or the reduced set of prizes based on the revealed prize symbols.

2. The electronic gaming device as claimed in claim 1, wherein the end condition is that a defined number of prize symbols corresponding to a prize of either the set of prizes or the reduced set of prizes are revealed in response to the selections of the selectable icons.

3. The electronic gaming device as claimed in claim 1, wherein the end condition is that a defined number of prize symbols corresponding to a prize of either the set of prizes or the reduced set of prizes are revealed in response to the selections of the selectable icons and another end condition of the plurality of end conditions is that a defined number of terminator symbols are revealed in response to the selections of the selectable icons.

4. The electronic gaming device as claimed in claim 1, wherein when the instructions are executed they cause the processor to control the display device to visually indicate removal of the one or more prizes by modifying the display of the selectable icons in the special effects animation.

5. The electronic gaming device as claimed in claim 4, wherein when the instructions are executed they cause the processor to modify the display of the selectable icons by changing the selectable icons in the special effects animation to display the removed one or more prizes.

6. The electronic gaming device as claimed in claim 4, wherein when the instructions are executed they cause the processor to modify the display of the selectable icons by changing the selectable icons in the special effects animation to visually indicate that the selectable icons may not be selected in a current game instance.

7. The electronic gaming device as claimed in claim 1, wherein upon the processor determining to remove the one or more prizes, the instructions cause the processor to remove a lowest prize.

8. The electronic gaming device as claimed in claim 1, wherein the instructions cause the processor to use the random number generator to select an outcome of the icon selection instance, the outcome defining the end condition and a number of selections until the end condition is met.

9. A non-transitory computer readable medium storing a plurality of instructions and reel data defining a plurality of reel strips for use with a gaming device comprising a display device, at least one input mechanism, a processor, and the instructions, when executed, cause the processor to perform the steps of:

using a weighted table and based on at least one or more numbers dynamically generated by a random number generator, mapping symbols from the reel strips for display at a plurality of symbol positions in response to receipt of a wager via the at least one input mechanism;

controlling the display device to display a special effects animation including the symbols mapped at the symbol positions;

evaluating the symbols mapped for one or more winning outcomes;

in response to a trigger condition being met, initiating an icon selection instance from which one prize of a set of prizes is awardable, wherein each prize has an associated prize symbol;

determining, using the at least one or more numbers dynamically generated by the random number generator and a second weighted table, whether to remove a prize from the set of prizes such that one prize of a reduced set of prizes may be awarded;

controlling the display device to update the special effects animation to include a plurality of selectable icons;

upon determining to remove a prize, controlling the special effects animation to visually indicate removal of the prize;

adjusting a probability of receiving an award by removing the prize;

receiving selections of the selectable icons via the at least one input mechanism until an end condition is met; and upon a defined number of prize symbols being revealed responsive to the selections of the selectable icons until the end condition is met, making the award from the set of prizes or the reduced set of prizes based on the revealed prize symbols.

10. The non-transitory computer readable medium as claimed in claim 9, wherein the end condition is that a defined number of prize symbols corresponding to a prize of either the set of prizes or the reduced set of prizes are revealed in the special effects animation in response to the selections of the selectable icons.

11. The non-transitory computer readable medium as claimed in claim 10, wherein one end condition of a plurality of end conditions is that a defined number of prize symbols corresponding to a prize of either the set of prizes or the reduced set of prizes are revealed in response to the selections of the selectable icons; and another end condition is that a defined number of terminator symbols are revealed in the special effects animation in response to the selections of the selectable icons.

12. The non-transitory computer readable medium as claimed claim 9, comprising controlling the display device to visually indicate removal of the prize by modifying the display of the selectable icons in the special effects animation.

13. The non-transitory computer readable medium as claimed in claim 9, comprising modifying the display of the selectable icons by changing the selectable icons to display the removed prize in the special effects animation.

14. The non-transitory computer readable medium as claimed in claim 9, comprising modifying the display of the selectable icons by changing the selectable icons in the special effects animation to visually indicate that the selectable icons may not be selected.

15. The non-transitory computer readable medium as claimed in claim 9, comprising, upon determining to remove the prize, removing a lowest prize.

16. The non-transitory computer readable medium as claimed in claim 9, comprising using the random number generator to select an outcome of the icon selection instance, the outcome defining the end condition and a number of selections until the end condition is met.

17. An electronic gaming system comprising:

at least one display device;

a random number generator;

at least one input mechanism;

one or more processors; and memory storing (i) reel data defining a plurality of reel strips, and (ii) instructions which, when executed by the one or more processors, cause the one or more processors to:

select, using at least one number dynamically generated by the random number generator and based on a target return to player (RTP), symbols from the reel strips for display at a plurality of symbol positions in response to receipt of a wager via the at least one input mechanism;

control the at least one display device to display a special effects animation including the selected symbols at the symbol positions;

evaluate the selected symbols for winning outcomes;

determine whether an icon selection event is triggered by a trigger condition;

in response to the trigger condition being met, executing the icon selection event;

control the at least one display device to modify the special effects animation to display an initial icon selection display comprising a predefined number of icons, each of the icons representing at least one prize of a set of prizes, wherein each prize has an associated prize symbol;

determine whether to remove at least one prize from the set of prizes based on a second trigger condition;

upon determining to remove the at least one prize, control the display device to modify the special effects animation to visually indicate the removal of the least one prize, such that a reduced set of prizes is displayed;

remove the at least one prize by displaying an unselectable version of the icon representing the at least one prize;

receive selections of the icons in the reduced set of prizes via the at least one input mechanism until an end condition of a plurality of end conditions is met;

upon a defined number of prize symbols being revealed responsive to the selections of the icons until the end condition is met, make an award from the set of prizes or the reduced set of prizes based on the revealed prize symbols; and modify the special effects animation to indicate the award.

18. The electronic gaming system as claimed in claim 17, wherein the end condition is that a defined number of prize symbols corresponding to a prize of either the set of prizes or the reduced set of prizes are revealed in response to the selections of the selectable icons.

19. The electronic gaming system device as claimed in claim 18, wherein the end condition is that a defined number of prize symbols corresponding to a prize of either the set of prizes or the reduced set of prices are revealed in response to the selections of the selectable icons and another end condition of the plurality of end conditions is that a defined number of terminator symbols are revealed in response to the selections of the selectable icons.

20. The electronic gaming system as claimed in claim 17, comprising modifying the display of the selectable icons by changing the selectable icons in the special effects animation to visually indicate that the selectable icons may not be selected in a current game instance.

* * * * *